March 26, 1968   K. H. MARCUS   3,375,364
VISOR-MIRROR ASSEMBLY

Filed Oct. 21, 1965   2 Sheets-Sheet 1

INVENTOR.
KONRAD H. MARCUS
BY
ATTORNEYS

March 26, 1968 K. H. MARCUS 3,375,364
VISOR-MIRROR ASSEMBLY
Filed Oct. 21, 1965 2 Sheets-Sheet 2

INVENTOR.
KONRAD H. MARCUS
BY Price & Heneveld
ATTORNEYS

United States Patent Office 3,375,364
Patented Mar. 26, 1968

3,375,364
VISOR-MIRROR ASSEMBLY
Konrad H. Marcus, Holland, Mich., assignor to Donnelly Mirrors, Inc., Holland, Mich., a corporation of Michigan
Filed Oct. 21, 1965, Ser. No. 499,404
4 Claims. (Cl. 240—4.2)

ABSTRACT OF THE DISCLOSURE

A vehicle visor assembly with an interior compartment from which a mirror is controllably extensible, the mirror preferably being semi-transparent to serve as a glare filter, and preferably a combined handle and light on the lower mirror edge for shifting the mirror and illuminating the object, with a switch to operate the light, preferably automatically with mirror extension and retraction.

---

This invention relates to visors such as are used in automobiles and the like, and more particularly to a new concept for a visor-mirror assembly having new and unique features and attributes.

Visors have long been used in automobiles for shielding the eyes of the driver from harsh direct or glaring light, principally sunlight, which otherwise is practically blinding in its effect. Since they are normally mounted at eye level in autos and other vehicles, such visors occupy a very convenient position at which to locate a mirror, and accessory mirrors have been devised in the past with external clips by which they may semi-permanently attached to the underside of the visor. However, these mirrors are often unattractive and thus detract from the appearance of the visor itself, since the means by which they are secured to the visor is often plainly visible, even when the visor is turned upwardly so that the mirror would otherwise be inconspicous. Further, on the many occasions when the visor is desired to be used solely to block out light, it is often annoying to have the mirror constantly at eye level where it always reflects an image. Such a mirror is also a safety hazard, since while in recent years visors have become padded to offer a cushion for the head in the event of a collision or the like, the presence of the hard and unyielding mirror on the outside of the visor nullifies the effects of the padding and thus constitutes a definite hazard. Also, such a mirror can readily shatter under impact and thereby cause additional injury.

Further, visor-mirrors have not normally been thought properly safe on the driver's side of the vehicle due to the potential confusing visual patterns formed and reflected to the driver's eyes when the visor is down.

Accordingly, it is a major object of the present invention to provide a safety visor-mirror assembly in which the mirror is normally enclosed within the visor with the reflective portion completely concealed from external view and contact with personnel. Yet, it may be readily partially or fully withdrawn therefrom when needed.

Another object of this invention is to provide a visor and vanity type mirror assembly having unique coaction causing the visor to not only serve its light blocking function and a mirror supporting function, but also forming a protective safety sheath over the mirror glass for protection of vehicle passengers.

Another important object of the invention is to provide a visor-mirror assembly of the aforesaid character which further includes its own source of light, by which objects located outwardly therefrom may be illuminated when desired, whether to view such objects directly with the eye or to better view them indirectly, through the mirror.

Another object of this invention is to provide a safety visor-mirror assembly advantageous and practical for the driver's side as well as the passenger's side, since no improper and confusing patterns are reflected into the driver's eyes, even when the visor is down.

The foregoing major objects of the invention, together with numerous other objects no less a part thereof, will become increasingly apparent following a consideration of the ensuing specification and its appended claims, particularly when taken in conjunction with the accompanying illustrative drawings setting forth a preferred embodiment thereof.

Figure 1:
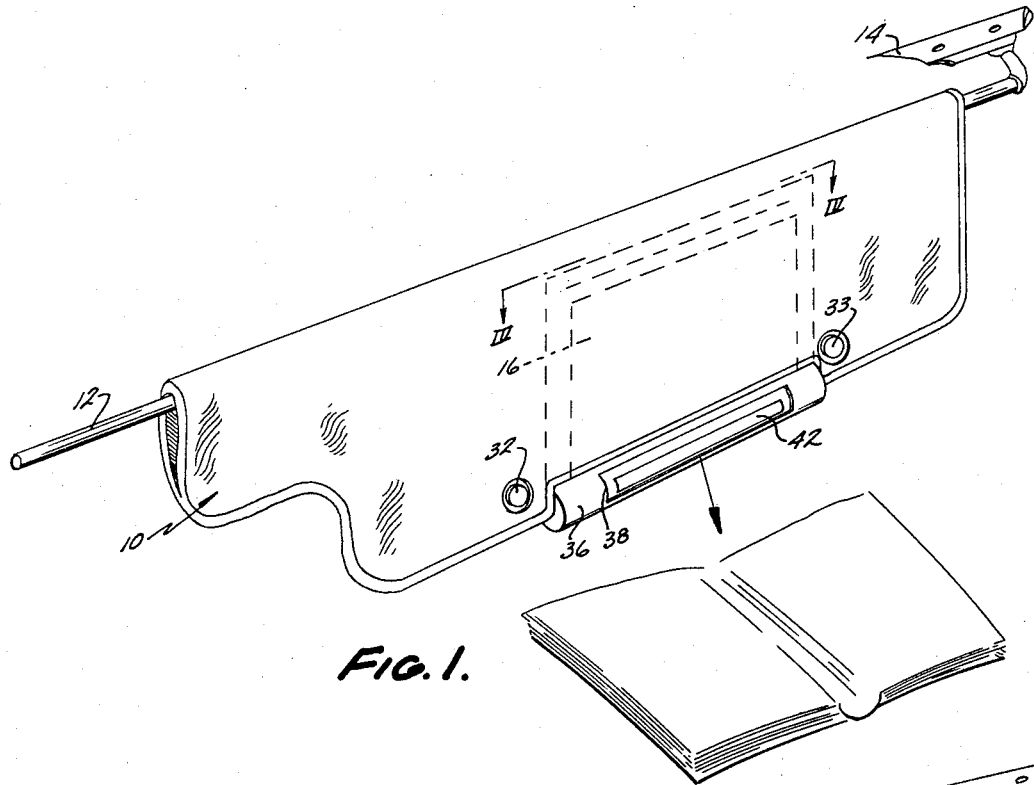
FIG. 1 is a frontal perspective view of the assembly, showing the mirror means thereof in a fully retracted position.

Briefly stated, the visor-mirror assembly of the invention includes a visor structure which defines an interior compartment, a mirror means, and mounting and guide apparatus within the said compartment for movably mounting the said mirror means therewithin. The mounting apparatus preferably provides a first position for the mirror means in which the same is at least partially withdrawn from said compartment, and a second position in which the said mirror means is retracted into the said compartment. Further, the mirror means preferably includes a light source for illuminating objects outwardly thereof, and this source is preferably adjustable or directable, so that it may be used either to illuminate a specific object or article such as for example something held in the hands or on the lap which is desired to be read, or the face of the person looking into the mirror, to see the reflected image thereof more clearly.

Referring now in more detail to the drawings, the visor structure 10 of the novel assembly is shown with a typical outward design configuration, rotatably connected to a suspension arm 12 having a bracket 14 by which the structure is mounted within the automobile. The visor structure 10 is formed with an internal compartment or pocket indicated at 16, which is provided between the external visor layers 25 and 25' of reinforced fabric or paperboard, preferably combined with layers of padding 27 and 27' such as sponge rubber or foam plastic material. A mirror means 18 is located within compartment 16 such that when fully inserted into the compartment (FIG. 1), it is substantially completely concealed therein, with the glass being completely within the visor sheath, but such that it may be withdrawn from the compartment (FIG. 2) for use.

Figure 3:
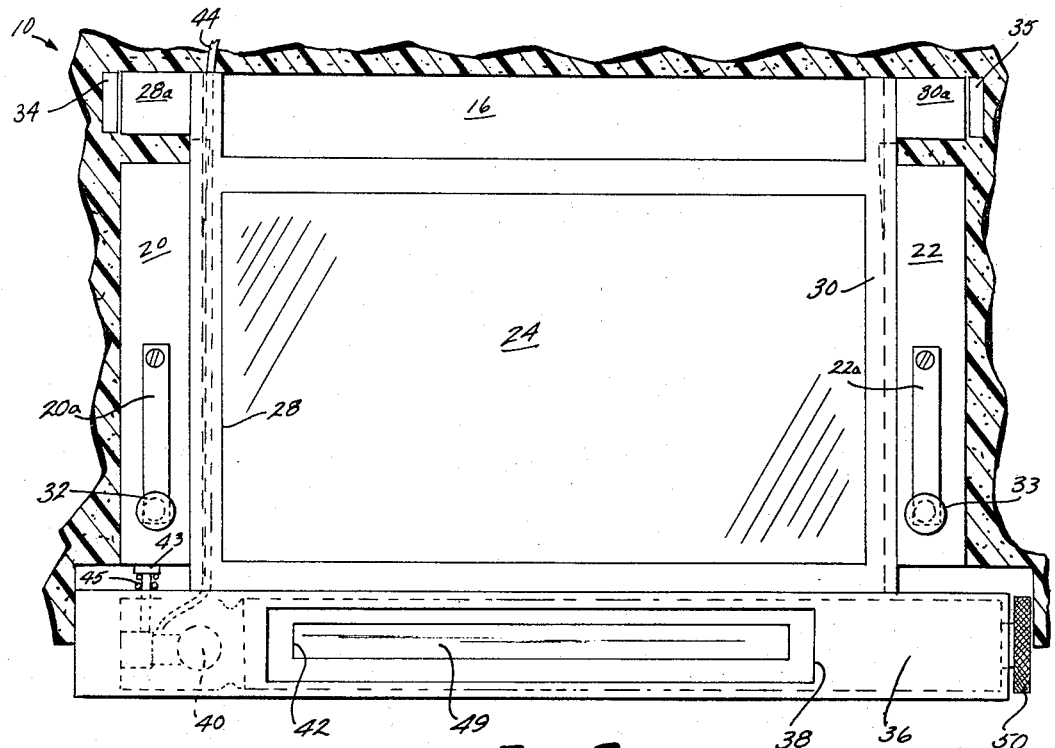
FIG. 3 is a fragmentary, enlarged front sectional elevation of the mirror means, its light source, and its mounting structure.
Figure 4:
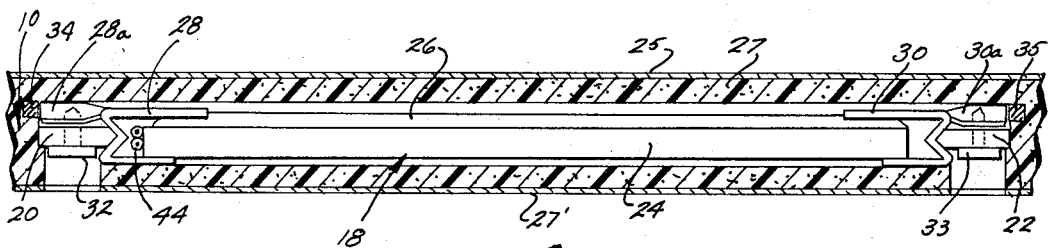
FIG. 4 is an enlarged overhead sectional plan view of the structure shown in FIG. 3, as taken through the plane IV—IV of FIG. 1.

More specifically, a pair of spaced, vertically-oriented guide rails or tracks 20 and 22 (FIGS. 3 and 4) are secured within the compartment 16 of the visor structure 10 for the purpose of slidably retaining the mirror means 18 therewithin. The mirror means includes a reflective element 24 of glass coated with a reflective metal, and preferably having a vinyl or other protective and sealing polymeric plastic backing 26 secured thereto. The glass is preferably "Chemcor" type by Corning Glass due to its flexing capacity. Generally channel shaped mounting frame elements 28 and 30 are secured to opposite lateral edges of reflective element 24 and its backing portion 26, such that both are firmly held between the extending leg portions of the mounting frames (FIG. 4). These are bonded to the vinyl back with mastic or the like.

The central portion of each of the mounting frames has an inwardly-directed V-shaped groove formed therein, and the inwardly-directed edge of each of the rails or tracks 20 and 22 is pointed somewhat to fit snugly into this groove, so that the mirror means is firmly but slidably retained between the tracks 20 and 22. In order to facilitate such sliding relative motion, the tracks are preferably formed from a lubricous plastic substance such as nylon or the like.

In order that the sliding withdrawal of the mirror means from the visor structure have a positive limit, a stop means is provided which establishes the maximum amount of such withdrawal. At its uppermost extremity, each of the mounting frames 28 and 30 has an outwardly-extending portion 28a and 30a, respectively, which is slightly offset from the center of its respective frame, so as to be positioned directly adjacent one side of the associated rail or track 20 and 22 (FIG. 4). A leaf spring 20a and 22a is secured to each of the tracks 20 and 22, respectively, on the opposite side thereof from which the offset extending mounting frame portions 28a and 30a move as the mirror means is withdrawn from the visor structure. Each of the leaf springs 20a and 22a has a stop screw 32 and 33 respectively, secured thereto, with the shank portion of the stop screws extending through the guide rails 20 and 22 and directly beneath the extending portions 28a and 30a of the mounting frames.

Figure 2:
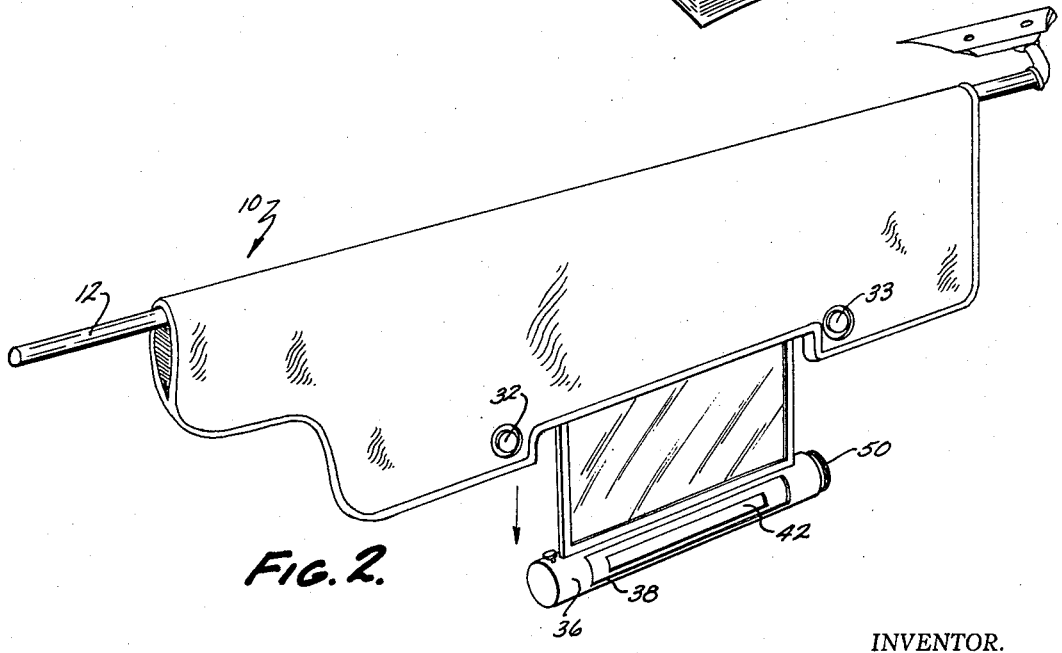
FIG. 2 is a frontal perspective view of the assembly showing the mirror means withdrawn from the visor.

Thus, it will be apparent that when the mirror means is withdrawn a predetermined distance, the extending portions 28a and 30a will come into direct abutment with the stop screws 32 and 33, thereby preventing further withdrawal of the mirror means. However, the visor structure 10 is preferably arranged so as to expose the head portion of each of the stop screws 32 and 33 (FIGS. 1 and 2).

Thus, for initial installation, or subsequent removal whenever it is desired, one may grasp the screws by their heads and move them outwardly by resiliently flexing the leaf springs 20a and 22a to which they are secured, to release the stop means. This withdraws the shank portion of the stop screws from their blocking position beneath the extending mounting frame portions 28a and 30a, thereby allowing the mirror means 18 to be initially inserted or to be completely withdrawn from the visor structure 10 whenever desired.

In order to make certain that the mirror means 18 remains fully retracted into the visor structure 10 once it is slid into this position, retention or latch means is provided between the mirror means and visor. Preferably, small magnets 34 and 35 (FIGS. 3 and 4) are mounted within the visor at the top of tracks 20 and 22, respectively, immediately adjacent the edges of the extending mounting frame portions 28a and 30a, respectively. The frame portions 28a and 30a are formed from a magnetizeable material. Consequently, once mirror means 18 has been fully retracted or inserted into the visor compartment the attraction between the magnets 34 and 35 and the frame portions 28a and 30a will cause it to remain in this position until intentionally withdrawn by a firm downward pull. Obviously, other alternative retention means could be employed.

As is illustrated in the various figures, the mirror means 18 includes a generally tubular sleeve-like element 36 which is secured to the bottom of the mounting frames 28 and 30. This forms a pull and push handle means for the glass mirror element, and also serves as a special illuminating means. Element 36 has at least one aperture window 38 formed therein, and a light source positioned within it so as to shine outwardly through the windows. The light source itself need include only a conventional bulb 40 (FIG. 3) and a suitable fixture 42 therefore. The bulb 40 is energized by wires 44 which pass through bracket 14, rod 12, visor structure 10, and downwardly through mounting frame 28, into the interior of tubular element 36. The fixture 42 for the illuminating bulb includes an on-off switch means. The switch means is preferably operated automatically with extension and insertion of the mirror subassembly. This may be done by abutment with a release from the fixed portions on the visor. Specifically, for example, the fixture includes contact means operated by a plunger 43 that is biased into an extended "on" position by spring 45, and shiftable to a depressed off position by abutment with the lower edge of track 20 (FIG. 3). Thus withdrawal of the mirror allows the plunger to be shifted by the spring to engage the contacts in fixture 42 to turn light 40 on, and return of the mirror turns it off.

Inside tubular element 36 is located a similarly-shaped but shorter and open ended element 48 (FIG. 3) having an arcuate window aperture 49 which is smaller than fixed window 38. The inner element 48 is rotatable within element 36, as by a shaft protruding through the latter and having an operating knob 50 secured thereto. Thus, when the bulb 40 is illuminated, rotation of knob 50 will vary the direction of the light emanating from window 49 to allow the light to be shone on a person's face (for make-up) or on his lap (to read or the like).

Thus, as will be apparent, by forming a desired number of the windows 38 in the outer element 36 at desired positions around its circumference, light may be directed out of any one such window by blocking all others with the inner tubular element 48. Consequently, the light source contained in the mirror means may be used for several purposes, including for example reading a map, book, or the like held on the lap beneath the visor (FIG. 1), or illuminating the face of the person looking into the mirror, so as to enable such a person to use the mirror under darkened conditions. It should be pointed out, however, that the mirror means 18 need not necessarily be withdrawn from the visor structure 10 in order to utilize the light source just described. This is pointed out by FIG. 1, wherein the mirror means is substantially entirely retracted into the visor structure, and yet the light source is being used to illuminate a book held immediately beneath the visor.

From the foregoing, it will be apparent that the present invention provides a highly unusual and unique visor-mirror assembly which admirably combines utilitarian visor-mirror aesthetic qualities, while simultaneously achieving a structure that is highly desirable from a safety point of view. The combination apparatus lends itself readily to new and aesthetic design treatments, and when the mirror means is fully retracted into the visor structure it hardly changes the outward appearances of the visor structure at all. Also, when retracted into the visor the mirror presents no safety hazard, since it is shielded and protected by the padded visor against direct impact by a person's head. Finally, the light source associated with the combined structure is in itself a new and useful device which also serves to enhance the usefulness of the mirror portion of the combinations.

The novel visor assembly can be safely employed on the driver's side of the vehicle since it not only has safety features relative to impact characteristics, but also has safety features because it does not cause confusing and irritating reflections into the driver's eyes when not being used, but with the visor lowered.

Further, if the mirror is of semi-transparent type, e.g. chromium plated, it may even serve as a glare filter for direct viewing by the driver through it.

If desired the driver could even have a map mounted to the unit so that, when extended from the visor-sheath, the driver has a quick map reference, properly illuminated, for instant use.

It is conceivable that upon considering the foregoing illustrative embodiment of the invention, others may choose to embody the concepts underlying the invention in specific structures which superficially differ from those shown herein but which nonetheless are clearly within the spirit of the invention and are actually based upon

I claim:

1. A visor assembly for autos and the like, comprising in combination: a padded visor structure forming an open end slot type sheath chamber; a mirror element in said sheath chamber extendible therefrom, and having an edge at said end; a combined handle means and light source mounted upon the lower edge to enable movement of said mirror element into and out of said sheath chamber and for illuminating objects outwardly thereof; and switch means for said light means actuated with extension and insertion of said mirror element to operate said light source.

2. The visor assembly of claim 1, wherein said light source is adjustably directable to illuminate selected objects.

3. A visor-mirror assembly for autos and the like, comprising in combination: a visor structure defining an interior compartment; a pair of vertically-oriented tracks in spaced relation fixed within said compartment; a mirror means mounted at its opposite side edges between said tracks to be vertically slidable relative thereto; said mirror means having at least one portion extending outwardly therefrom within said compartment; at least one abutment structure located within said compartment and in the path of said outwardly extending mirror means portion to obstruct the passage thereof and thereby limit the extent said mirror means may be withdrawn from said compartment by sliding vertically between said tracks and said mirror means being semi-transparent, to serve as a glare filter when extended.

4. A visor assembly for autos and the like, comprising in combination: a padded visor structure forming an open end slot type sheath chamber; a mirror element in said sheath chamber extendible therefrom, and having an edge at said end; a combined handle means and light source mounted upon the lower edge to enable movement of said mirror element into and out of said sheath chamber and for illuminating objects outwardly thereof; said light source being pivotally adjustably directable on an axis along the lower edge of said mirror element; and switch means for said light means.

References Cited

UNITED STATES PATENTS

| 2,228,209 | 1/1941 | Harrington | 296—97.37 |
| 2,262,875 | 11/1941 | Almer | 240—4.2 |
| 2,596,873 | 5/1952 | Solmes | 296—97.37 |
| 3,203,052 | 8/1965 | Curtis | 240—4.2 |

FOREIGN PATENTS 819,915   9/1959   Great Britain.

NORTON ANSHER, *Primary Examiner.*

M. H. HAYES, *Assistant Examiner.*